United States Patent
Abad Molina

(10) Patent No.: US 9,774,369 B2
(45) Date of Patent: Sep. 26, 2017

(54) DETECTION AND PREVENTION OF INTERMODULATION PRODUCTS ABOVE ELECTROMAGNETIC COMPATIBILITY (EMC) LEVELS FOR POWER LINE COMMUNICATION (PLC) DEVICES

(71) Applicant: Avago Technologies General IP (Singapore) Pte. Ltd., Singapore (SG)

(72) Inventor: Jose Abad Molina, Malaga (ES)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/196,919

(22) Filed: Jun. 29, 2016

(65) Prior Publication Data

US 2017/0155426 A1    Jun. 1, 2017

Related U.S. Application Data

(60) Provisional application No. 62/290,710, filed on Feb. 3, 2016.

(51) Int. Cl.
*H04B 3/54* (2006.01)
*H04B 17/309* (2015.01)

(52) U.S. Cl.
CPC ............. *H04B 3/54* (2013.01); *H04B 17/309* (2015.01)

(58) Field of Classification Search
CPC ................................. H04B 3/54; H04B 17/309
See application file for complete search history.

(56) References Cited

U.S. PATENT DOCUMENTS

| | | | | |
|---|---|---|---|---|
| 8,385,570 B2* | 2/2013 | Chiang | ............... | H04R 19/013 381/191 |
| 8,867,594 B2* | 10/2014 | Shad | ...................... | H04B 3/54 375/224 |
| 9,525,460 B1* | 12/2016 | Vazquez | .................. | H04B 3/48 |
| 9,608,696 B2* | 3/2017 | Afkhami | ................. | H04B 3/54 |
| 2011/0103436 A1* | 5/2011 | Kim | ..................... | H04L 5/0007 375/219 |
| 2016/0336999 A1* | 11/2016 | Smaini | .................... | H04B 3/54 |

* cited by examiner

*Primary Examiner* — Jean B Corrielus
(74) *Attorney, Agent, or Firm* — Sterne, Kessler, Goldstein & Fox P.L.L.C.

(57) ABSTRACT

The present disclosure is directed to systems, apparatuses, and methods for monitoring the frequency spectrum of signals transmitted by a PLC device over a PLC network to detect and correct potential EMC regulation violations due to intermodulation (IMD) products created by the interaction of the transmitted signals with one or more non-linear devices on the PLC network. Once an IMD issue is detected, the systems, apparatuses, and methods can reduce the injected power of signals transmitted by the PLC device at the frequencies (or range of frequencies) that result in a EMC regulation violation. In addition, the systems, apparatuses, and methods can reduce the injected power of signals transmitted by the PLC device at all times or during times that the non-linear devices are interacting and generating IMD products.

20 Claims, 5 Drawing Sheets

DETECTION AND PREVENTION OF INTERMODULATION PRODUCTS ABOVE ELECTROMAGNETIC COMPATIBILITY (EMC) LEVELS FOR POWER LINE COMMUNICATION (PLC) DEVICES

CROSS REFERENCE TO RELATED APPLICATIONS

This application claims the benefit of Spanish Patent Application No. 201531743, filed Dec. 1, 2015, and claims the benefit of U.S. Provisional Application No. 62/290,710, filed Feb. 3, 2016, all of which are incorporated herein by reference in their entireties.

TECHNICAL FIELD

This application relates generally to Power Line Communication (PLC).

BACKGROUND

Power Line Communication (PLC) is a communication technology that allows data to be sent over power lines simultaneously with Alternating Current (AC) (e.g., 50 Hz or 60 Hz) or Direct Current (DC) electric power. An advantage of this communication technology is that an electronic device can be powered up and communicate data to and from another device using the same power line. Another advantage of this communication technology is that power lines preexist in nearly all homes and buildings to provide power via, for example, electric outlets. Thus, a PLC network can often be built without installing new or additional wires.

Numerous PLC standards exist to ensure inter-operability among devices on a common PLC network, as well as to improve the reliability of simultaneous data communication and power transfer over the power lines of such networks. One known issue with PLC networks is the electromagnetic interference (EMI) that transmissions over these networks can produce. The power lines can act as an antenna and radiate power of the transmissions. Such EMI can cause interference with wireless devices operating in the same or very near frequency bands. To this end, regulations exist that set electromagnetic compatibility (EMC) levels that limit the amount of EMI that can be produced by many PLC devices.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It will be apparent to persons skilled in the relevant art(s) that various elements and features of the present disclosure, as described herein, can be implemented in hardware using analog and/or digital circuits, in firmware, in software, through the execution of instructions by one or more general purpose or special-purpose processors, or as a combination of two or more of hardware, firmware, and software.

1. Overview

The present disclosure is directed to systems, apparatuses, and methods for monitoring the frequency spectrum of signals transmitted by a PLC device over a PLC network to detect and correct potential EMC regulation violations due to intermodulation (IMD) products created by the interaction of the transmitted signals with one or more non-linear devices on the PLC network. Once an IMD issue is detected, the systems, apparatuses, and methods can reduce the injected power of signals transmitted by the PLC device at the frequencies (or range of frequencies) that result in a potential EMC regulation violation. In addition, the systems, apparatuses, and methods can reduce the injected power of signals transmitted by the PLC device at all times or during times that the non-linear devices are interacting and generating IMD products. The systems, apparatuses, and methods can be implemented at the PLC device transmitting the signals and/or at one or more other PLC devices on the PLC network. These and other feature of the present disclosure are described further below.

2. EMC Requirements and IMD Products

Figure 1:
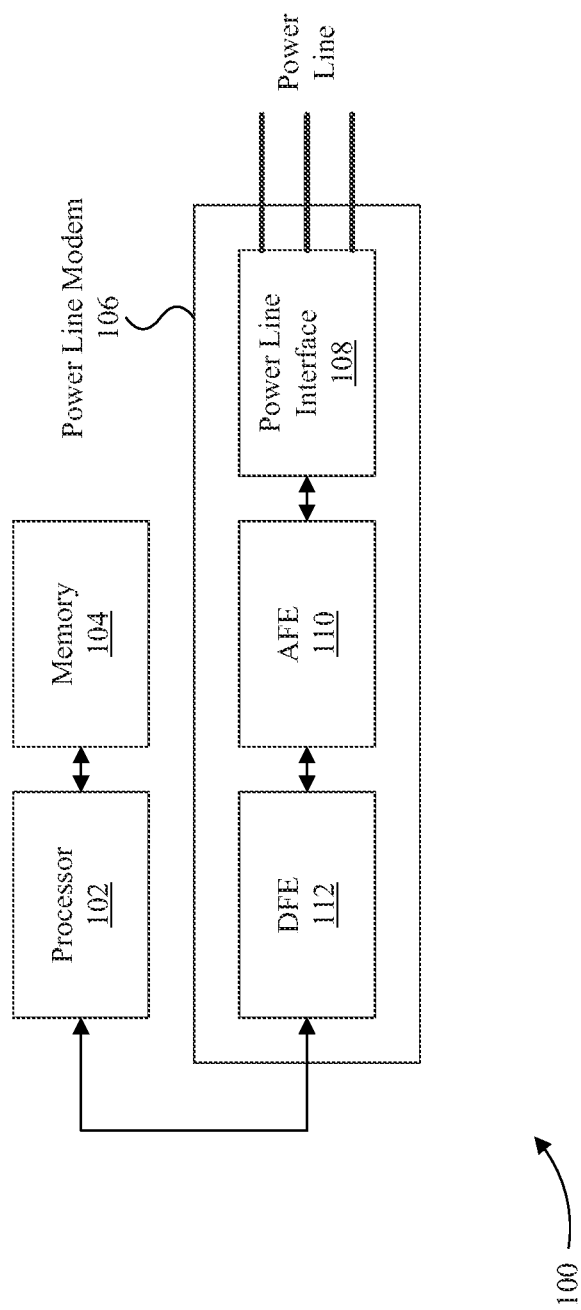
FIG. 1 illustrates a block diagram of an example PLC device according to embodiments of the present disclosure.

FIG. 1 illustrates a block diagram of an example PLC device 100 in accordance with embodiments of the present disclosure. The PLC device 100 supports PLC operations according to one or more PLC communication standards. In some embodiments, the PLC device 100 can be permanently installed within a home or other premises. In other embodiments, the PLC device is mobile and services power line communications when plugged into an electric outlet.

The PLC device 100 includes a processor 102, a memory 104, and a power line modem 106 that includes a power line interface 108, an analog front end (AFE) 110, and a digital front end (DFE) 112. The processor 102 can include one or more of a general purpose processor, a digital signal processor (DSP), an application specific integrated circuit (ASIC), or other circuitry that is capable of executing software instructions and for processing data. In particular, the processor can support Medium Access Control (MAC) management, communications bridging management, and other management of the communications circuitry of the PLC device 100. The memory 104 may be random access memory (RAM), read only memory (ROM), FLASH RAM, FLASH ROM, optical memory, magnetic memory, or another type of memory that is capable of storing data and/or instructions for processing by processor 102. The AFE 110 includes analog signal processing elements, while the DFE 112 includes digital signal processing elements.

In operation, processor 102 provides digital data to DFE 112 for transmission over a power line coupled to power line interface 108. DFE 112 modulates that data onto one or more carriers using a modulation scheme such as orthogonal frequency division multiplexing (OFDM). In general, OFDM is a multicarrier communication scheme that transmits data over F orthogonal tones (or sub-carriers). Before transmission, DFE 112 maps the data to a series of complex symbols (e.g., binary phase shift keying (BPSK), quadrature phase shift keying (QPSK), or quadrature amplitude modulation (QAM) symbols), referred to as source symbols, and divided into F parallel symbol streams. The F parallel symbol streams are treated as though they are in the frequency-domain and are used as inputs to an inverse fast Fourier transform (IFFT) block in DFE 112 that transforms them into the time-domain. The IFFT block specifically takes in F source symbols at a time, one from each of the F parallel symbol streams, and uses each to modulate the amplitude and/or phase of a different one of F sinusoidal basis functions that correspond to the F orthogonal tones. The output of the IFFT block is F time-domain samples that represent the summation of the F orthogonal tones. The F time-domain samples form a single OFDM symbol.

After generating the OFDM symbol, DFE 112 can convert the OFDM symbol into the analog domain using a digital-to-analog converter (DAC) (not shown) and provide it to AFE 110 for further processing before being transmitted over the power line. In particular, AFE 110 can up-convert and amplify the OFDM symbol (and others) provided by DFE 112. AFE 110 can then provide the up-converted and amplified OFDM symbol to power line interface 108 for transmission over the power line. Power line interface 108 includes circuitry for coupling the up-converted and amplified OFDM symbol to the power line.

In the receive direction, OFDM symbols received over a carrier via the power line are provided to AFE 110 from power line interface 108. AFE 110 amplifies and down-converts the OFDM symbols to baseband. AFE 110 then converts the OFDM symbols to the digital domain using an analog-to-digital converter (ADC) (not shown) and provides the digital OFDM symbols to DFE 112.

DFE 112 inputs the time domain samples of each OFDM symbol into an FFT block that transforms them into the frequency domain. The output of the FFT block is a set of source symbols that were carried by the orthogonal tones of the OFDM symbol. DFE 112 de-maps the source symbols into a series of bits (digital data) and provides them to processor 102.

It should be noted OFDM is just one example modulation scheme that can be used by the PLC device 100 to transmit and receive signals over the power line. Other schemes, including FDM using non-orthogonal tones, can be used as would be appreciated by one of ordinary skill in the art.

The PLC device 100 can also include one or more other communication interfaces (not shown), including a wireless wide area network (WWAN), e.g., a WiMAX or LTE interface, a wireless local area network (WLAN) interface, e.g., an IEEE 802.11x interface, a wireless personal area network (WPAN) interface, e.g., a Bluetooth interface, a 60 GHz interface (millimeter wave interface), a wired LAN interface, e.g., an Ethernet interface, a cable interface, e.g. Multimedia over Coax Alliance (MoCA) interface, an optical interface, a Near Field Communication (NFC) I/F, an Infra-Red I/F, and/or a radio frequency (RF) Tag I/F. The PLC device 100 can bridge communications between a power plug and one or more devices, e.g., between the power plug and a desktop computer, a laptop computer, a touchpad computer, an appliance, a television, another entertainment system device, etc., via the power line modem 106 and one or more of the other communication interfaces mentioned above.

In general, a PLC device passes EMC requirements if the radiated power resulting from a signal it transmits over a PLC network is below required levels at all regulated frequencies for the area in which the PLC device is operated. Radiated power depends on injected power or the power spectral density (PSD) of the signal transmitted over a power line by the PLC device plus other factors that determine the part of the signal energy that is emitted to the air and then coupled to other devices or antennas.

Figure 2A:
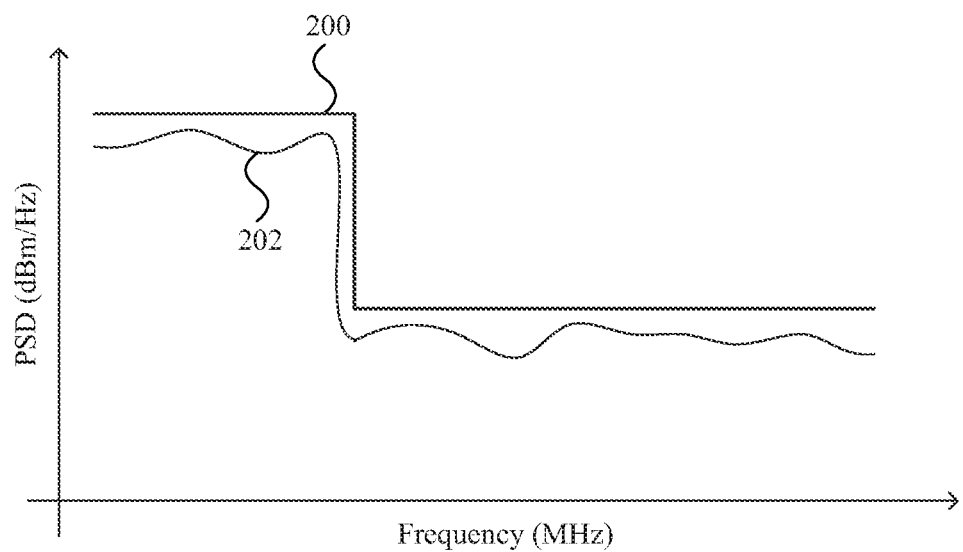
FIG. 2A illustrates an example transmit power spectral density (PSD) limit mask that defines PSD limits for PLC communications over a range of frequencies and a spectrum of a signal transmitted by a PLC device over a PLC network with no non-linear devices.

FIG. 2A illustrates an example transmit spectrum mask 200 that defines power spectral density (PSD) limits for PLC communications over a range of frequencies. In general, a PLC device passes or meets EMC requirements if the power of the signals it transmits are below the PSD limits defined by the transmit spectrum mask 200 for the range of frequencies shown.

FIG. 2A further illustrates the frequency spectrum 202 of an example signal transmitted by a PLC device, such as PLC device 100 in FIG. 1. The frequency spectrum 202 corresponds to the measured power of the signal when the PLC device is coupled to a PLC network with no other device (or at least no other devices that cause intermodulation (IMD) products of the kind discussed below). As can be seen from FIG. 2A, the PLC device meets the EMC requirements defined by the transmit spectrum mask 200.

When installed in a real PLC network, the signal transmitted by the PLC device may interact with one or more other non-linear devices connected to the PLC network, including, for example, switching regulators found in mobile chargers, energy saving lamps, and other devices. The result is that there may be some IMD products created by the interaction, which may in turn result in the power levels of the transmitted signal at the regulated frequencies (e.g., amateur radio frequencies or the FM band) to be higher than the EMC regulations for those frequencies demand.

More specifically, a signal transmitted by the PLC device can enter one of these non-linear devices via the power line. The non-linear device subsequently operates on the signal to produce an output. The non-linearity of the device leads to harmonics in its output that occur at multiples of each frequency tone in the input signal. These harmonics can couple to the power line and exceed PSD limits for PLC communications at the frequencies of those harmonics.

Figure 2B:
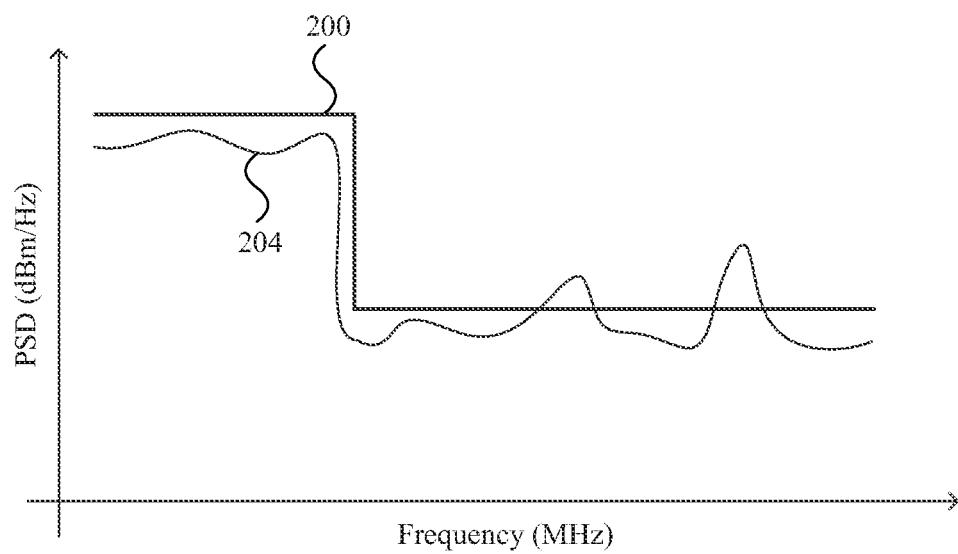
FIG. 2B illustrates the same example transmit PSD limit mask shown in FIG. 2A and a spectrum of a signal transmitted by a PLC device over a PLC network with one or more non-linear devices.

FIG. 2B illustrates a frequency spectrum 204 of the same signal transmitted by the same PLC device discussed above in regard to FIG. 2A but now under the scenario where the transmitted signal interacts with one or more non-linear devices connected to the PLC network, resulting in IMD products. As can be seen from FIG. 2B, the interaction between the PLC device and the one or more non-linear devices connected to the PLC network has caused the frequency spectrum 204 of the signal transmitted by the PLC device to exceed the power limits defined by the transmit spectrum mask 200 over a few frequency ranges. Together, FIG. 2A and FIG. 2B show that the PLC device may pass EMC regulation limits alone, but when the PLC device is placed on the same PLC network as one or more other non-linear devices, their interaction may cause EMC limits to be exceeded. Thus, there is a need to periodically or continuously monitor the spectrum of signals transmitted by a PLC device on a PLC network.

3. Detection of IMD Issues

The present disclosure is directed to apparatuses, systems, and methods for monitoring the frequency spectrum of signals transmitted by a PLC device after the PLC device has been placed on a PLC network. The apparatuses, systems, and methods can be used to detect potential EMC regulation violations based on the monitored frequency spectrum due, for example, to IMD products created by the interaction of the PLC device with one or more other non-linear devices on the PLC network. The apparatuses, systems, and methods can be implemented at the PLC device transmitting the signal and/or at one or more other devices on the PLC network.

Figure 3:
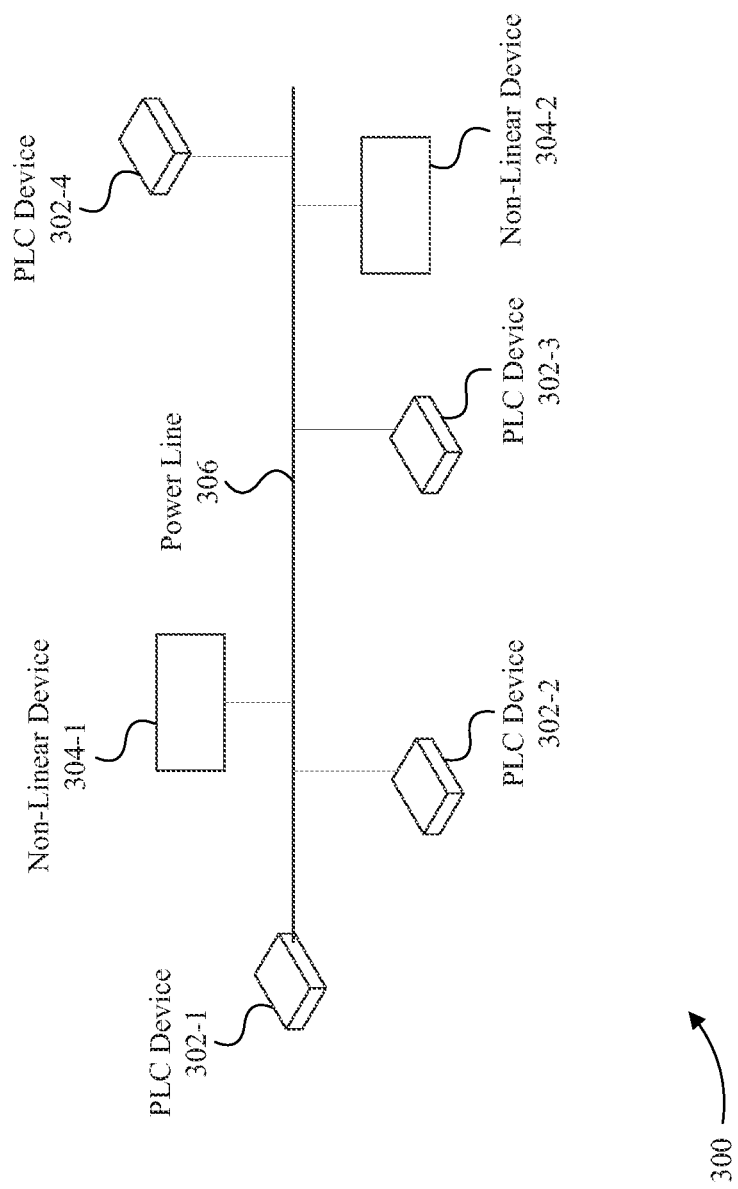
FIG. 3 illustrates an example PLC network in accordance with embodiments of the present disclosure.

FIG. 3 illustrates an example PLC network 300 where a PLC device 302-1 transmits a signal with an associated frequency spectrum that, on a PLC network with no other devices, complies with EMC regulations. However, due to interaction(s) with one or more of the non-linear devices 304-1 and 304-2 on the PLC network 300, the PLC device 302-1 does not comply with EMC regulations when connected and operating on the PLC network 300. The interaction specifically results in IMD products that cause the transmitted signal to violate EMC regulations.

In an embodiment, the PLC device 302-1 can monitor its own signal transmissions over the PLC network 300 to detect and correct EMC regulation violations. For example, the PLC device 302-1 can monitor its own signal transmissions over the PLC network 300 and compute the frequency spectrum of the monitored signal using, for example, the Fourier Transform. The computed frequency spectrum provides the power of each frequency present in the monitored signal transmission. An example frequency spectrum of a transmitted signal was shown in FIG. 2A as described above.

Once computed, the PLC device 302-1 can use the computed frequency spectrum to detect EMC regulation violations by comparing the frequency spectrum to a predefined spectrum mask as further described above in regard to FIG. 2A. For any frequencies where the power of the monitored signal exceeds the spectrum mask, the PLC device 302-1 can reduce the injected power at those frequencies for subsequent transmissions.

In one embodiment, the PLC device 302-1 can be implemented in the same or similar manner as the example PLC device illustrated in FIG. 1 and described above. In such an embodiment, the PLC device 302-1 can reuse the FFT block implemented in DFE 112 for performing OFDM to monitor the frequency spectrum of the signal transmitted over the PLC network 300. In addition, processor 102 can analyze the resulting frequency spectrum to determine frequency components of the communication signal that violate PSD limits defined by the spectrum mask. The processor 102 can then control the power line modem 106, and more specifically the DFE 112, to reduce a power injected on the power line at frequencies corresponding to the determined frequency components of the communication signal that violate the PSD limits defined by the spectrum mask.

In another embodiment, one or more of the other PLC devices 302-2 through 302-4 on the PLC network 300 can receive the signal transmitted by the PLC device 302-1 over the PLC network 300, compute the frequency spectrum of the signal, and detect EMC regulation violations. The computation of the frequency spectrum and the detection of EMC regulation violations can be done in the same manner as described above in regard to PLC device 302-1. For any frequencies where the power of the monitored signal exceeds the spectrum mask, the one or more PLC devices 302-2 through 302-4 can construct and transmit a message over the PLC network 300 to the PLC device 302-1. The message can include the amount (in terms of power) in which each frequency exceeds the spectrum mask. After receiving such a message, the PLC device 302-1 can reduce the injected power at those frequencies for subsequent transmissions to prevent any further EMC regulation violations.

In yet another embodiment, one or more of the PLC devices 302-1 through 302-4 (including the PLC device 302-1 from which the signal originates) can receive the signal transmitted by the PLC device 302-1 over the PLC network 300, compute the frequency spectrum of the signal, and detect EMC regulation violations. The computation of the frequency spectrum and the detection of EMC regulation violations can be done in the same manner as described above in regard to PLC device 302-1. For any frequencies where the power of the monitored signal exceeds the spectrum mask, the one or more PLC devices 302-2 through 302-4 can construct and transmit a message over the PLC network 300 to a designated, centralized intelligence device with the frequencies in violation. The message can include the amount (in terms of power) in which each frequency exceeds the PSD limit mask. After receiving such a message, the centralized intelligence device can decide/determine which frequencies are in violation (e.g., based on a consensus among the messages it receives) and then construct and send a message of its own over the PLC network with the frequencies to the PLC device 302-1. The PLC device 302-1 can reduce the injected power at those frequencies indicated in the message for subsequent transmissions to prevent any further EMC regulation violations.

It should be noted that more or less than the four PLC devices 302-1 through 302-4 can be used in other PLC networks. It should be further noted that more or less than the two non-linear device 304-1 and 304-2 can be used in other PLC networks.

Figure 4:
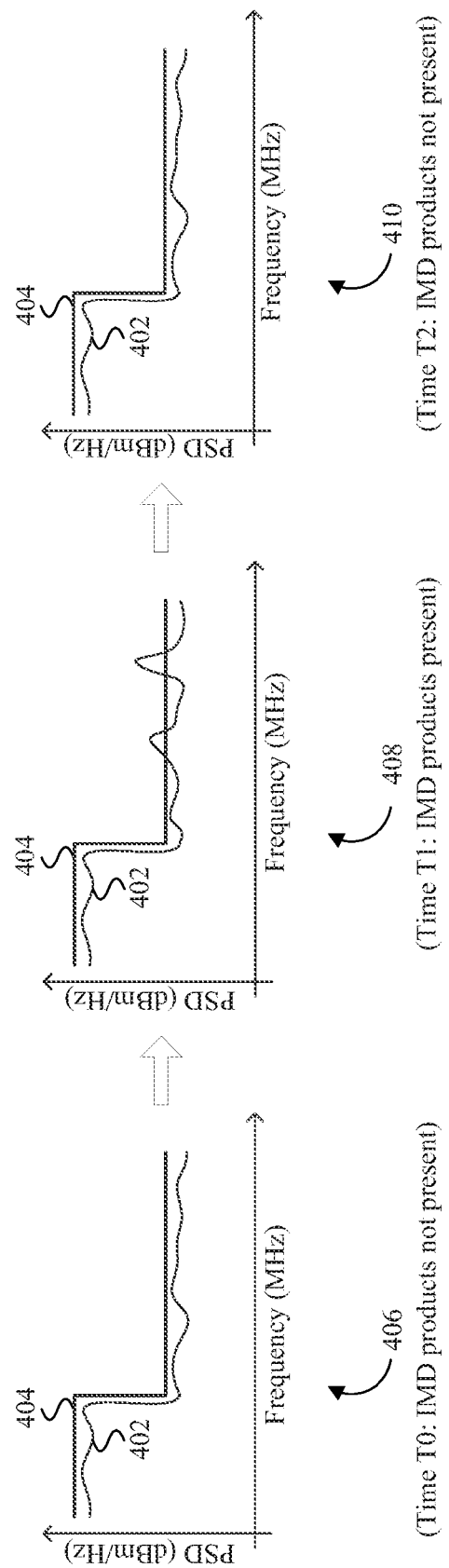
FIG. 4 illustrates exemplary transmit PSD limit masks and a spectrum of a signal transmitted by a PLC device over time in accordance with embodiments of the present disclosure.

In the embodiments described above, the detection of EMC regulation violations may be done accurately enough to distinguish between periods of time when the IMD issue is present and periods of time when the IMD issue is not present. Typically, the IMD issue appears when a non-linear device switches (e.g., as part of the operation of a voltage regulator), something that may happen only at certain points in time during the AC cycle of the electrical power carried over the power lines of the PLC network 300. FIG. 4 illustrates this potential time based nature of the IMD issue.

More specifically, FIG. 4 illustrates the frequency spectrum 402 of an example signal transmitted by a PLC device over an AC power line as compared to an example transmit spectrum mask 404 at three different times 406, 408, and 410 during a cycle of the AC power carried by the AC power line. As can be seen, the IMD products and EMC regulation violation occur only at time 408 during the cycle of the AC power carried by the AC power line. The signal transmitted by PLC device can be monitored over one or more cycles of the AC power line to determine the times when IMD products and EMC regulation violations occur. With this knowledge, the PLC device 302-1 can then reduce the power injected on the AC power line at frequencies corresponding to the determined frequency components of the transmitted signal that violate the PSD limits defined by the spectrum mask 404 only at those times.

Figure 5:
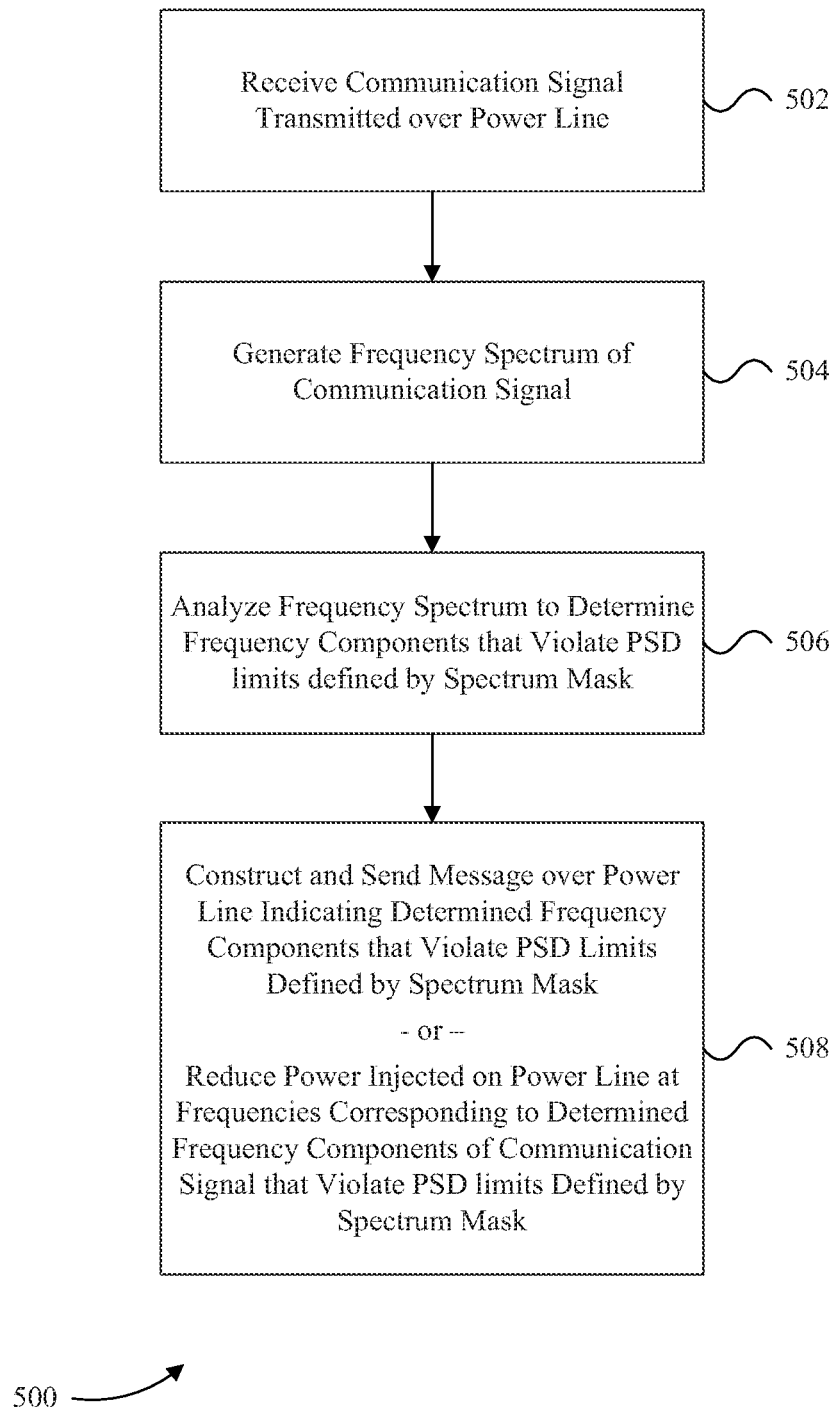
FIG. 5 illustrates a flowchart of a method for detecting and preventing EMC regulation violations in signals transmitted over a PLC network in accordance with embodiments of the present disclosure.

Referring now to FIG. 5, a flowchart 500 of a method for detecting and preventing EMC regulation violations in signals transmitted over a PLC network in accordance with embodiments of the present disclosure is illustrated. The method of flowchart 500 can be implemented by one of PLC devices 302-1 through 302-4 illustrated in FIG. 3 or some other PLC device.

The method of flowchart 500 begins at step 502. At step 502, a communication signal is received over a power line of a PLC network. The communication signal can originate from the PLC device receiving the communication signal or some other PLC device on the PLC network.

After step 502, the method of flowchart 500 proceeds to step 504. At step 504, a frequency spectrum of the communication signal is generated. For example, an FFT can be performed on time domain samples of the communication signal to generate the frequency spectrum. The FFT can be a part of a power line modem used to perform OFDM.

After step 504, the method of flowchart 500 proceeds to step 506. At step 506, the frequency spectrum is analyzed to determine frequency components of the communication signal that violate PSD limits defined by a spectrum mask.

After step 506, the method of flowchart 500 proceeds to step 508. At step 508, a message is constructed and sent over the power line indicating the determined frequency components of the communication signal that violate PSD limits defined by the spectrum mask. The message can include the amount by which the frequency components violate the PSD limits defined by the spectrum mask. After receiving the message, the PLC device from which the communication signal originates can reduce the injected power at those frequencies for subsequent transmissions to prevent any further EMC regulation violations.

In an alternative embodiment, where steps 502-506 are performed by the PLC device from which the communication signal originates, at step 508 the injected power at the frequencies determined to violate the PSD limits defined by the spectrum mask can be reduced to prevent any further EMC regulation violations.

4. Conclusion

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. An apparatus comprising:
   a power line modem configured to receive a communication signal transmitted over an alternating current (AC) power line and generate a frequency spectrum of the communication signal; and
   a processor configured to analyze the frequency spectrum of the communication signal to determine frequency components of the communication signal that violate power spectral density (PSD) limits defined by a spectrum mask,
   wherein the PSD limits defined by the spectrum mask correspond to electromagnetic compatibility (EMC) requirements, and
   wherein the determined frequency components of the communication signal that violate the PSD limits defined by the spectrum mask occur due to a non-linear device that operates on the communication signal.

2. The apparatus of claim 1, wherein the communication signal was transmitted over the AC power line by the power line modem of the apparatus.

3. The apparatus of claim 1, wherein the processor is further configured to control the power line modem to reduce a power injected on the AC power line at frequencies corresponding to the determined frequency components of the communication signal that violate the PSD limits defined by the spectrum mask.

4. The apparatus of claim 1, wherein the processor is further configured to construct a message to be transmitted over the AC power line indicating the determined frequency components of the communication signal that violate the PSD limits defined by the spectrum mask.

5. The apparatus of claim 4, wherein the message is sent over the AC power line to a device from which the communication signal originated.

6. The apparatus of claim 4, wherein the processor is further configured to determine an amount by which one or more of the determined frequency components of the communication signal violate the PSD limits defined by the spectrum mask.

7. The apparatus of claim 6, wherein the processor is further configured to include in the message the amount, or an indication of the amount, by which the one or more of the determined frequency components of the communication signal violate the PSD limits defined by the spectrum mask.

8. The apparatus of claim 1, wherein the power line modem is configured to perform a fast Fourier transform on the communication signal to generate the frequency spectrum of the communication signal.

9. The apparatus of claim 1, wherein the determined frequency components of the communication signal that violate the PSD limits defined by the spectrum mask occur due to intermodulation products produced by the non-linear device that operates on the communication signal.

10. The apparatus of claim 1, wherein the processor is further configured to determine whether the determined frequency components of the communication signal that violate the PSD limits defined by the spectrum mask violate the PSD limits only during certain periods of time that are periodic with AC power carried by the AC power line.

11. A method comprising:
receiving a communication signal transmitted over an alternating current (AC) power line;
generating a frequency spectrum of the communication signal; and
analyzing the frequency spectrum of the communication signal to determine frequency components of the communication signal that violate power spectral density (PSD) limits defined by a spectrum mask;
wherein the PSD limits defined by the spectrum mask correspond to electromagnetic compatibility (EMC) requirements,
wherein the determined frequency components of the communication signal that violate the PSD limits defined by the spectrum mask occur due to a non-linear device that operates on the communication signal.

12. The method of claim 11, further comprising:
constructing a message to be transmitted over the AC power line indicating the determined frequency components of the communication signal that violate the PSD limits defined by the spectrum mask.

13. The method of claim 12, further comprising:
sending the message over the AC power line to a device from which the communication signal originated.

14. The method of claim 12, further comprising:
determining an amount by which one or more of the determined frequency components of the communication signal violate the PSD limits defined by the spectrum mask.

15. The method of claim 14, further comprising:
including the amount, or an indication of the amount, by which the one or more of the determined frequency components of the communication signal violate the PSD limits defined by the spectrum mask in the message.

16. The method of claim 11, wherein the determined frequency components of the communication signal that violate the PSD limits defined by the spectrum mask occur due to intermodulation products produced by the non-linear device that operates on the communication signal.

17. An apparatus comprising:
a power line modem configured to receive a first communication signal transmitted over an alternating current (AC) power line; and
a processor configured to process a message contained in the first communication signal indicating frequency components of a second communication signal that violate power spectral density (PSD) limits defined by a spectrum mask;
wherein the PSD limits defined by the spectrum mask correspond to electromagnetic compatibility (EMC) requirements,
wherein the frequency components of the second communication signal that violate the PSD limits defined by the spectrum mask occur due to intermodulation products produced by a non-linear device that operates on the second communication signal.

18. The apparatus of claim 17, wherein:
the second communication signal is transmitted by the power line modem over the power line, and
the processor is further configured to control the power line modem to reduce a power injected on the AC power line at frequencies corresponding to the frequency components of the second communication signal that violate the PSD limits defined by the spectrum mask.

19. The apparatus of claim 17, wherein:
the power line modem is configured to receive a third communication signal transmitted over the AC power line, wherein the first and third communication signals are transmitted over the AC power line by different power line communication (PLC) devices, and
the processor is configured to process a message contained in the third communication signal indicating the frequency components of the second communication signal that violate PSD limits defined by the spectrum mask.

20. The apparatus of claim 19, wherein the processor is further configured to construct a second message, based on the processing of the message in the first communication signal, to be transmitted over the AC power line indicating the determined frequency components of the second communication signal that violate the PSD limits defined by the spectrum mask.

* * * * *

UNITED STATES PATENT AND TRADEMARK OFFICE
CERTIFICATE OF CORRECTION

PATENT NO. : 9,774,369 B2
APPLICATION NO. : 15/196919
DATED : September 26, 2017
INVENTOR(S) : Jose Abad Molina It is certified that error appears in the above-identified patent and that said Letters Patent is hereby corrected as shown below:

On the Title Page

Add item (30) Foreign Application Priority Data:
Dec. 1, 2015    (SP) ........... 20151743

In the Claims

In Column 10, Line 24, replace "modem over the power line" with --modem over the AC power line--

Signed and Sealed this
Eighteenth Day of September, 2018

Andrei Iancu
*Director of the United States Patent and Trademark Office*